UNITED STATES PATENT OFFICE.

MORITZ ULRICH, JOHANN BAMMANN, AND MARTIN HERZBERG, OF ELBERFELD, GERMANY, ASSIGNORS TO THE FARBENFABRIKEN, VORMALS FR. BAYER & CO., OF SAME PLACE.

BROWN DYE.

SPECIFICATION forming part of Letters Patent No. 515,381, dated February 27, 1894.

Application filed May 3, 1893. Serial No. 472,825. (Specimens.)

*To all whom it may concern:*

Be it known that we, MORITZ ULRICH, JOHANN BAMMANN, and MARTIN HERZBERG, doctors of philosophy, chemists, and assignors to the FARBENFABRIKEN, VORMALS FR. BAYER & Co., of Elberfeld, subjects of the Emperor of Germany, residing at Elberfeld, Prussia, Germany, have invented a new and useful Improvement in the Manufacture of Coloring-Matters; and we do hereby declare the following to be a full and exact description of the invention.

Our invention relates to the manufacture of a brown substantive coloring-matter resulting from the action of one molecular proportion of diazoalphanaphthalene upon one molecular proportion of the coloring-matter formed by combining one molecular proportion of tetrazodiphenylchlorid with one molecular proportion of amidonaphtholdisulfoacid $$(NH_2:SO_3H:SO_3H:OH=1:3:6:8)$$

and one molecular proportion of metaphenylenediamin.

The new brown coloring-matter has the following formula:

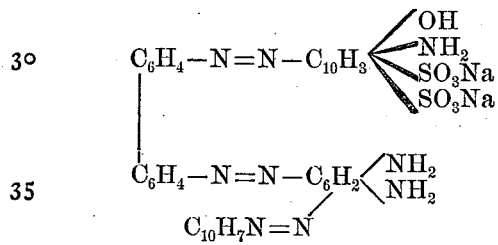

In carrying out our invention we proceed as follows: 2.9 kilos, by weight, of benzidin are converted in the well known manner with 2.2 kilos, by weight, of sodium nitrite and 10 kilos, by weight, of hydrochloric acid (20° Baumé) into the tetrazo compound. 5.7 kilos, by weight, of the sodium salt of amidonaphtholdisulfoacid $$(NH_2:SO_3H:SO_3H:OH=1:3:6:8)$$

dissolved in fifteen liters of water are poured with careful cooling into the solution of the above tetrazo compound. The intermediate product from equal molecular proportions of tetrazodiphenylchlorid and amidonaphtholdisulfoacid separates by the addition of an excess of sodium acetate in the state of a gelatinous precipitate. When after standing for some time the reaction is completed, the whole mixture is added to a watery solution containing 1.61 kilos, by weight, of meta phenylene diamin, and then the resulting mixture is neutralized by adding a concentrated solution in water of six kilos, by weight, of sodium carbonate ($Na_2CO_3$). When after some time the formation of the intermediate dye-stuff is complete, the liquid mixture is heated and the intermediate dye-stuff is salted out by means of common salt, filtered off and pressed. The thus obtained coloring-matter without drying is dissolved in water containing five kilos, by weight, of sodium carbonate ($Na_2CO_3$) and then a solution of diazonaphthalenechlorid is added which is prepared in the well known manner from 2.3 kilos, by weight, of alpha naphthylamin by means of nine kilos, by weight, of hydrochloric acid (20° Baumé) and 1.1 kilos, by weight, of sodium nitrite. The new coloring-matter, the formation of which is completed after some time by raising slowly the temperature of the reaction mixture to about 100° centigrade, is salted out, filtered off, pressed and dried.

The dye-stuff has the following properties: It forms a brownish-black powder easily soluble in hot water with violet-blue color, soluble in ammonia with violet-red color, insoluble in concentrated soda-lye and hydrochloric acid (20° Baumé). By concentrated sulfuric acid (66° Baumé) it is dissolved with a blue color, while on adding ice water to the sulfuric acid solution a dark brown precipitate is separated.

The dye-stuff has the following composition:

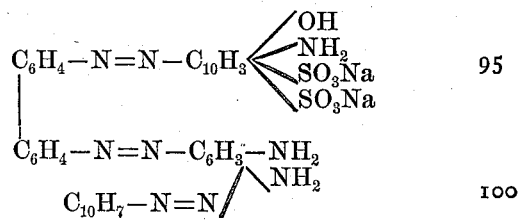

It produces on unmordanted cotton brown shades and, when fixed on the fiber, it can be diazotized and directly be coupled with any dye-stuff component, (for instance beta naphthol,) shades fast to washing and soaping being thus obtained.

Having thus described our invention, what we claim, and desire to secure by Letters Patent, is—

1. The process of producing a new coloring matter, which consists in treating tetrazo-diphenyl chlorid with one molecular proportion of amidonaphtholdisulfo-acid $$(NH_2:SO_3H:SO_3H.OH\ 1:3:6:8),$$

adding to the resulting product one molecular proportion of metaphenylene diamin, and acting on the dye stuff thus produced with one molecular proportion of diazoalpha-naphthalene chlorid, as hereinbefore described.

2. The process for producing a new coloring matter by causing one molecular proportion of diazo naphthalene chlorid to act with one molecular proportion of the intermediate dye-stuff hereinbefore described derived from tetrazo diphenyl chlorid, amido naphthol disulfo acid, and meta phenylene diamin, substantially as described.

3. The new coloring-matter having the following formula:

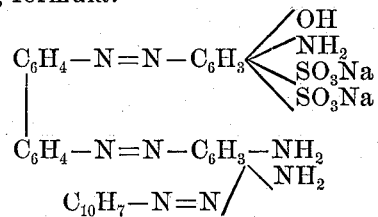

and which is a brownish-black powder, easily soluble in hot water with violet-blue color, soluble in ammonia with violet-red color, insoluble in concentrated soda-lye and hydrochloric acid of 20° Baumé, but soluble in concentrated sulfuric acid with a blue color, from which solution, on addition of ice water, a dark brown precipitate separates, and having the qualities substantially as described.

In testimony whereof we have signed our names in presence of two subscribing witnesses.

MORITZ ULRICH.
JOHANN BAMMANN.
MARTIN HERZBERG.

Witnesses:
WM. ESSENWEIN,
RUDOLPH FRICKE.